United States Patent [19]
Green

[11] 4,276,618
[45] Jun. 30, 1981

[54] MAPPING SYSTEMS

[75] Inventor: Ian M. Green, Buckie, Scotland

[73] Assignee: E M I Limited, Hayes, England

[21] Appl. No.: 38,053

[22] Filed: May 11, 1979

[30] Foreign Application Priority Data

May 25, 1978 [GB] United Kingdom ............... 22289/78

[51] Int. Cl.³ ............................................. G01S 15/89
[52] U.S. Cl. .................................. 367/11; 343/5 SC; 367/105
[58] Field of Search ...................... 367/7, 11, 103, 105, 367/113; 343/5 SC

[56] References Cited
U.S. PATENT DOCUMENTS 4,099,419  7/1978  Kuroda et al. .......................... 367/11
4,180,790  12/1979  Thomas .................................... 367/7

Primary Examiner—Richard A. Farley
Attorney, Agent, or Firm—Fleit & Jacobson

[57] ABSTRACT

For ultrasonic or other mapping systems which use PPI scan, it is desirable to convert the data to a raster scan format for, say, T.V. display. This may be achieved by conversion in a frame store. It is here proposed to time the PPI scan so that points interrogated by the effective receiving beam lie also on line of a cartesian matrix in the mapped region which correspond to the raster lines of the display thus the conversion is directly achieved.

11 Claims, 5 Drawing Figures

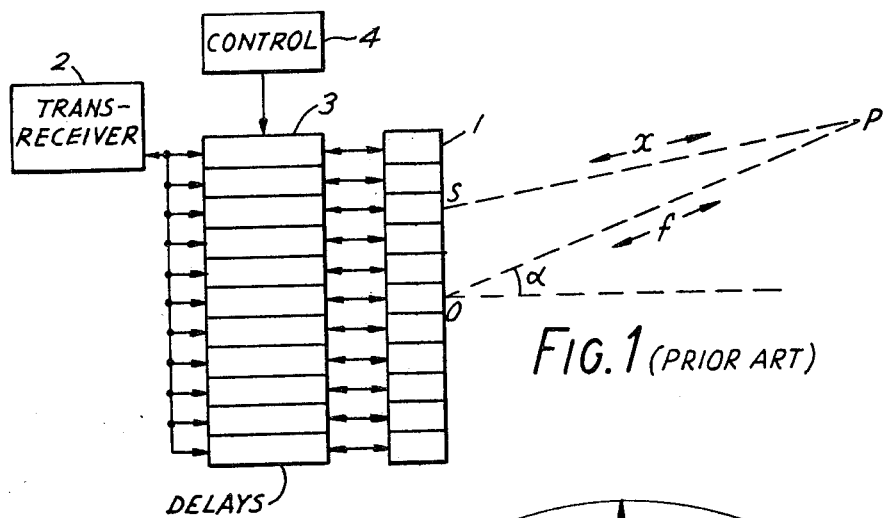
FIG. 1 (PRIOR ART)
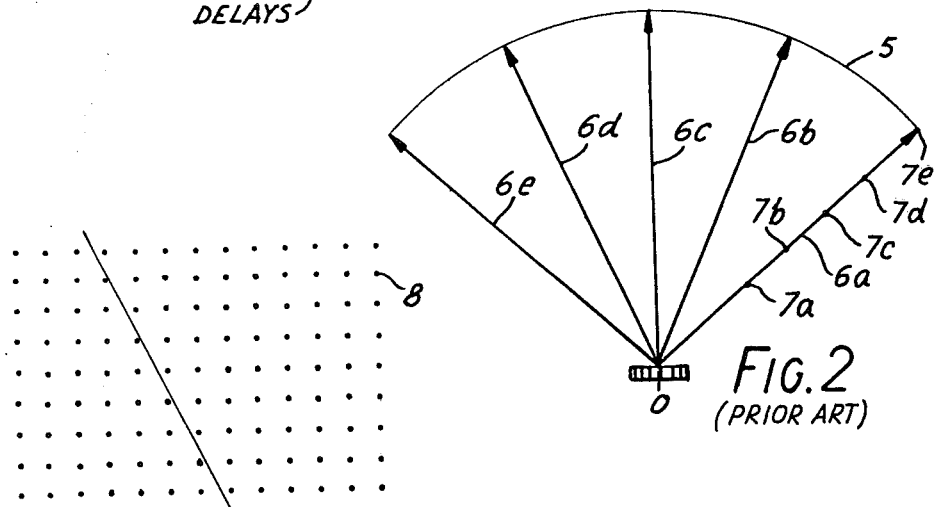
FIG. 2 (PRIOR ART)
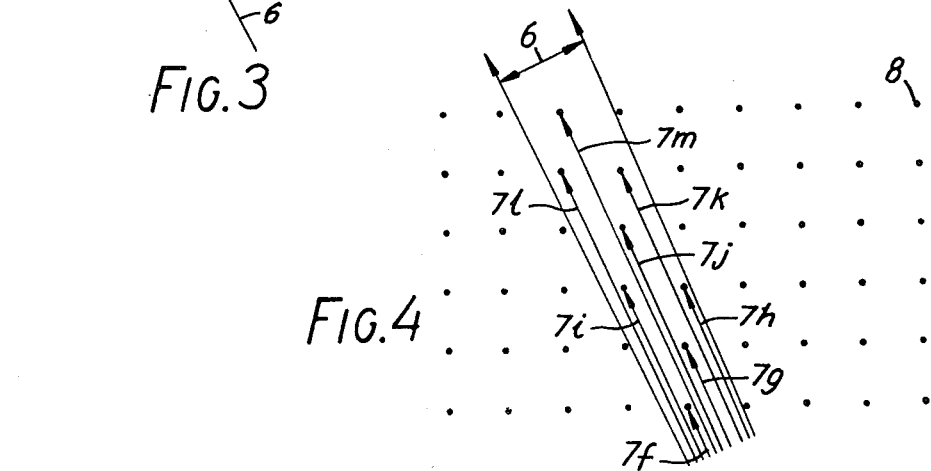
FIG. 3
FIG. 4

MAPPING SYSTEMS

The present invention relates to mapping or examination systems which derive information about a region of interest by transmitting energy and receiving energy reflected within the region in a sector of a circle. The invention is particularly related to such systems which derive the information in the form of a plan position indicator (PPI) scan.

Although it is possible to display such information using a display, such as a cathode ray tube, which shows the information in the PPI format, it is convenient to convert the information for a display as a rectangular scan. In particular, conversion can be to a standard television format, thus allowing conventional television equipment and techniques to be used for subsequent processing and display.

It is known to achieve the conversion by various techniques involving standards conversion in suitable stores. It is an object of this invention to provide a method of mapping the original data to more readily allow conversion to television format.

According to the invention there is provided a method of operating an apparatus, for surveying a region, the apparatus including transmitter means capable of transmitting energy along a plurality of paths lying radially in a sector of a circle and receiver means capable of being focussed on positions in said region to receive energy reflected therein, the method being suitable to provide echo data, for individual ones of a plurality of positions in said region, suitable for display on a raster of scanned lines in a display apparatus, and including the steps of defining a plurality of said positions disposed on a cartesian matrix notionally defined in said region such that lines of said positions correspond to said scanned lines of said display arrangement; directing the transmitted energy into the region along a plurality of said radial paths such that each path is of sufficient width to intercept a plurality of said positions; focussing the receiver means in sequence on each of the plurality of positions intercepted by one of said paths to receive energy reflected therein; and repeating the preceding step for the other said paths.

In one embodiment of the invention the apparatus is a phased array of ultrasonic transducers, some of said transducers being transmitting transducers and some of said transducers, which may include transmitting transducers, being receiving transducers.

In order that the invention may be clearly understood and readily carried into effect, it will now be described by way of example with reference to the accompanying drawings of which:

FIG. 1 shows a known ultrasonic probe suitable for use with the invention,

FIG. 2 is used to explain the operation of the probe of FIG. 1,

FIG. 3 is used to explain the problem to which this invention is directed,

FIG. 4 illustrates the method of the invention, and

Figure 5:
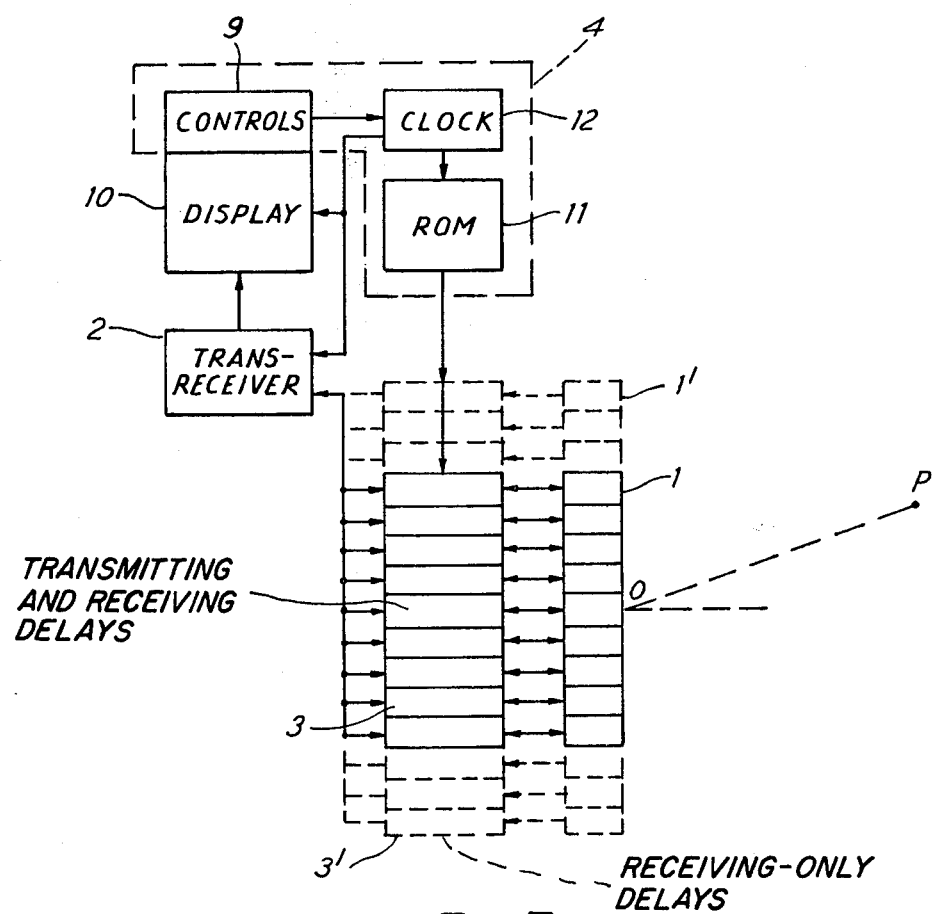
FIG. 5 shows the arrangement of FIG. 1 modified to implement the invention.

Existing mapping systems, including ultrasonic systems such as medical ultrasonic equipment and radar systems, have been designed to transmit energy over relatively wide beams and to direct a receiving system to receive echo signals over a relatively narrow effective receiving "beam" within the transmitted beam. The present invention is applicable to those systems and in particular those for which the disposition or range of the receiving "beam" can be changed relatively rapidly.

FIG. 1 shows a typical medical ultrasonic probe providing a PPI scan by a phased array of individual transducer elements. An example of such a probe is the EMI-SONIC 4500 probe marketed by EMI-Medical Inc. The probe illustrated includes eleven piezoelectric transmitting and receiving transducer elements 1, although a practical system includes more. Each element is pulsed by pulses at a suitable frequency from a transmitter pulse generator 2, the pulses being applied by individual variable delays 3, controlled by a master control circuit 4. The ultrasonic energy thus transmitted is reflected from reflecting objects at a suitable range and the energy is received at the same array to provide pulses to be processed by suitable receiver circuits. The pulses received are also passed through delays which, in the example shown, are the same delay circuits 3. Also in this example, the receiver circuits are included with transmitter pulse generator 2.

In operation, the delays 3 are controlled to focus the transmitted energy in beams in chosen directions. Thus to focus on point P the energy from centre transducer 0 is delayed to arrive at point P at the same time as the energy from transducer S and the other transducers. This means that the delay from the transducer to P, plus the delay in delay circuit 3, is the same for all transducers in the array. In practice point P is placed substantially central to the region to be examined so that the transmitted beam is not properly focussed on points nearer than or further than P. Of course, since the aperture is relatively small compared with the wavelength, the focus is not in any case very fine and the deviation from focus over the examined region, for one transmit beam will not be great.

The transmitting transducers are focussed successively on sequences of points, such as P lying on an arc around the array, as shown at 5 in FIG. 2. The delays are changed so as to, in effect, scan a transmitted beam of energy radially through the sector bound by that arc. Five of the many positions of that beam are shown at 6a to e. For reception of reflected energy, the delays are organised in the same manner so that energy reflected at P at one instant is received at receiver 2 at the same time for all tranducers. In the same way the delays are varied so as to scan the point from which echo signals are received in phase. The effect is the same as if a notional receiving "beam" were focussed on a point and scanned radially through the sector and the use of the delays 3 for reception will be described as the focussing of a receive beam although such a "beam" does not in fact exist.

Transmitted energy focussed on a point such as P will insonify all points along its path before and after P. However, it is preferable to focus the receiver on individual points in the receiving "beam". Therefore, for each transmitted beam at one angle, such as 6a, the receiving beam is focussed in succession as a sequence of points such as 7a to e along 6a. The total effect achieved is a PPI or sector scan comprising echo signals for a plurality of points in space along radii 6 in the sector. The scan can be displayed on a cathode ray tube as a PPI display or converted to, for example, a television format.

The arrangement so far described is known and can be purchased from appropriate suppliers. There are also equivalent systems for other surveillance methods such as radar.

The requirement imposed by the method of the present invention on such systems is that control 4 and delays 3 be sufficiently fast in response to achieve the effect to be described.

Conventionally, for conversion to TV format, the PPI data are read into a digital frame store at locations relating to the locations of the reflecting points in space. They are then read out in sequences relating to the TV lines. In practice, this often requires interpolation at some stage so that sufficient data exists for the TV lines. It would be preferable if the data were acquired only for points which lie in suitable lines so that on application to the frame store they form a TV raster.

In practice, however, the PPI lines, such as 6, do not intersect points lying in a cartesian matrix, for a TV raster, except in special cases. FIG. 3 shows part of such cartesian matrix of points 8. If data could be obtained for all of these points on the PPI scan, then they could be read directly from the frame store as a reaster. However, PPI line 6 shown does not pass through the points and only a few such lines, diagonals and verticals as the Figure, can pass through a significant number of points.

The method of this invention is described in relation to FIG. 4 for a similar part of a cartesian matrix to be examined. It is proposed that the transmitted beam 6 from array 1 now shown be relatively wide compared with the matrix of points to be examined and thus it is shown in FIG. 4 by two lines which schematically indicate its outer limits. This may be achieved partly by limiting the aperture of the transmitting array. The beam 6 is, of course, to be rotated around the PPI sector as before, being pulsed at each of a series of positions, but it is only necessary to illustrate one such position in FIG. 4. The receiving beam is effectively narrower than the transmitted beam, an effect achieved in part by increasing the aperture of the receiving array. The receiving beam is also made agile in relation to the transmitted beam. For each position of the transmitted beam it is focussed successively on different matrix points at different distances from the array 1. In FIG. 4 the successive positions of the receiving beam 7, for one position of transmitted beam 6 are shown by $7f$ to $7m$ and they are pulsed in that sequence. It will be apparent that this method of operation of the array and associated delays requires several changes of the receiving delays for each position of the transmitted beam. However, the delays required are predetermined for the scanning geometry described, regardless of any factors in the individual examination. They can be, therefore, preprogrammed into read-only-memories to be derived for each scan.

The modified arrangement is shown FIG. 5 in which those transducers, 1', and the corresponding delay, 3' which are for receiving purposes only are shown in broken lines. Control unit 4 includes operator controls 9, of conventional form, conveniently combined with the display unit 10. The precalculated delay values are held in read-only-memories (ROM) 11. It will be understood that the examination will in general always follow the same sequence. Thus the delay values may be derived from the ROM 11 in a predetermined sequence for application to delay units 3. The derivation sequence is, in this example, controlled by a clock 12 initiated by controls 9. The clock 12 may conveniently be used also to time the operation of transmitter and receiver circuits 2 and display 10.

Once the data have been derived for points 8 lying on the matrix shown, it will be clear that there is no problem in reading them from the frame store along lines as required for television display.

As described hereinbefore ROM 11 holds the required delay. To store the delays for each point in the picture a large ROM capacity is required and it may be desired to generate coordinates for a sequence of points in the picture and then generate, by an appropriate algorithm or circuit, the delays for each point. In practice the sequence of points can be stored in ROM 11 as a coordinate for the start of each line and the difference between the coordinates for each point and the next in the sequence.

Alternatively the sequence of coordinates may be generated as required. For example the area to be covered by the receive sequence (transmitted beam 6 in FIG. 4) may be considered to be bounded by lines at angles $\theta$ and $\phi$ to the perpendicular to the array at the beam apex ($6c$ in FIG. 2) and the cartesian matrix to be spaced by unity steps in the two orthogonal directions. Than for the kth row of the cartesian matrix, from an arbitrary origin, it is necessary to determine $k \tan \theta$ and $k \tan \phi$. Any integers between these numbers are then points in the sequence. Thus if $k \tan \theta$ and $k \tan \phi$ are, say, $-1.4$ and $-2.4$ for $k=2$, the point 2, $-2$ is in the sequence k is then increased to 3 and the calculation repeated.

This is simply achieved in binary calculation as each value of $k \tan \theta$ and $k \tan \phi$ is produced by adding $\tan \theta$ or $\tan \phi$ to the last one. Integers between the numbers are simply obtained by truncation and comparison.

I claim:

1. A method of operating an apparatus, for surveying a region, the apparatus including transmitter means capable of transmitting energy along a plurality of paths lying radially in a sector of a circle and receiver means capable of being focussed on positions in said region to receive energy reflected therein, the method being suitable to provide echo data, for individual ones of a plurality of positions in said region, suitable for display on a raster of scanned lines in a display apparatus, and including the steps of defining a plurality of said positions disposed on a cartesian matrix notionally defined in said region such that lines of said positions correspond to said scanned lines of said display arrangement; directing the transmitted energy into the region along a plurality of said radial paths such that each path is of sufficient width to intercept a plurality of said positions; focussing the receiver means in sequence on each of the plurality of positions intercepted by one of said paths to receive energy reflected therein; and repeating the preceding step for the other said paths.

2. A method according to claim 1 for operating an ultrasonic examining apparatus.

3. A method according in claim 1 for operating an apparatus comprising a phased array of ultrasonic transducers, some of said transducers being transmitting transducers and some of said transducers, which may include transmitting transducers, being receiving transducers.

4. A method according to claim 3 including operating the array with a first aperture as a transmitting array and with a second, larger, aperture as a receiving array.

5. A method according to claim 1 for operating a radar apparatus.

6. A method of operating an ultrasonic apparatus having a phased array of ultrasonic transducers to provide an effective raster scan, the method including the steps of: defining a plurality of positions disposed on a cartesian matrix in a region to be examined; directing transmitted ultrasonic energy into the region along a plurality of radial paths such that each path is of sufficient width to intercept a plurality of said positions; focussing the ultrasonic transducers operated as a receiver in sequence on each of the plurality of positions intercepted by one of said paths to receive energy reflected therein; and repeating the preceding step for the other said paths.

7. A method of operating an apparatus, for surveying a region, comprising a phased array of energy transmitting and receiving devices, the method including the steps of: defining a plurality of positions disposed on a cartesian matrix in the region; directing the transmitted energy into the region along a plurality of radial paths such that each path is of sufficient width to intercept a plurality of said positions; focussing the devices, operated as receiving devices, in sequence on each of the plurality of positions intercepted by one of said paths to receive energy reflected therein; and repeating the preceding step for the other said paths.

8. An apparatus for examining a region, the apparatus including: transmitter means for transmitting energy along paths lying radially in a sector of a circle; receiver means for receiving energy reflected at positions, in said region, intercepted by the path on which the energy was transmitted; means for causing the transmitter means to transmit the energy into the region along a plurality of radial paths each of which is sufficient width to intercept several of a plurality of said positions which are disposed on a cartesian matrix notionally defined in said region; means for focussing the receiver means in sequence on positions, disposed on said matrix, intercepted by the path on which the energy was transmitted, to provide signals each of which represents the energy reflected at an individual one of said positions; and a display arrangement adapted to display the received signals on a raster of scanned lines representing lines of said cartesian matrix.

9. An apparatus according to claim 8 in which the transmitting and receiving means are phased arrays of ultrasonic transducers.

10. An apparatus according to claim 8 in which at least some of the receiving transducers are the transmitting transducers.

11. An apparatus according to either of claim 8 or 9 in which the aperture of the array of transmitting transducers is smaller than the aperture of the array of receiving transducers.

* * * * *